United States Patent Office 3,345,226
Patented Oct. 3, 1967

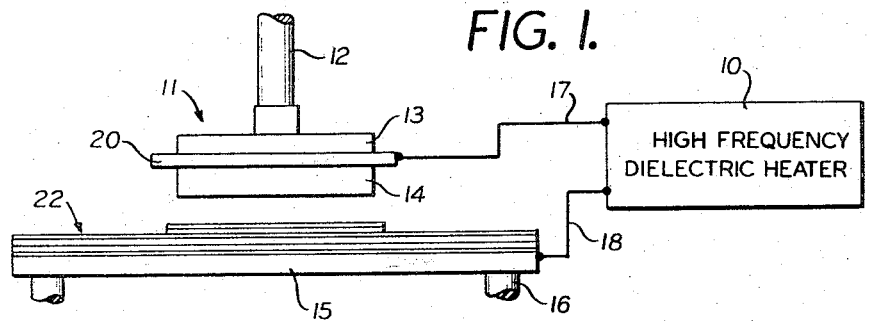
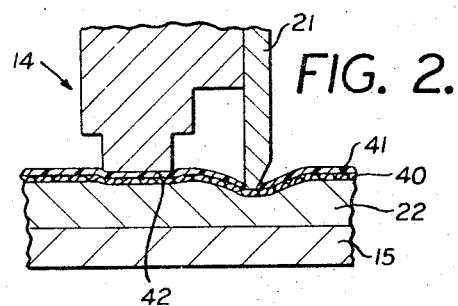
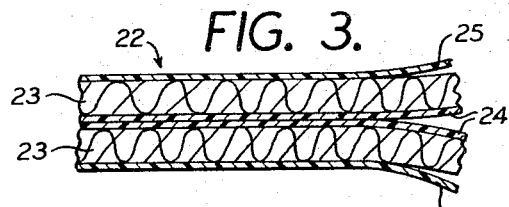
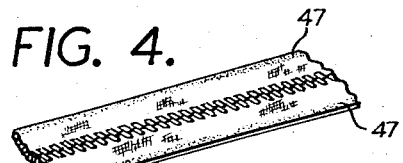
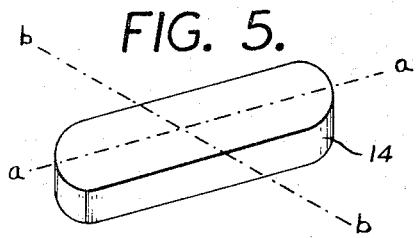
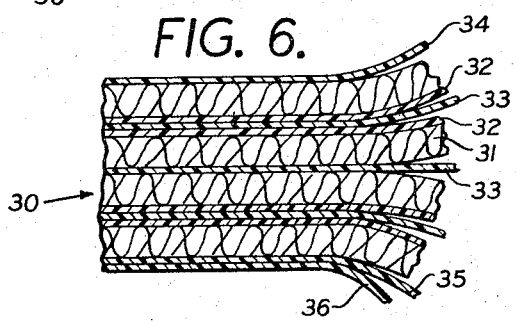
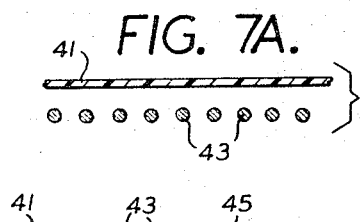
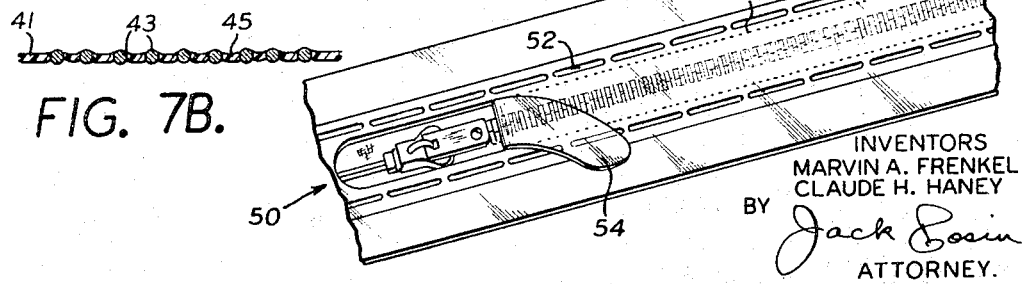

3,345,226
METHOD FOR TEAR SEALING THERMOPLASTIC SHEETS TO CLOTH
Marvin A. Frenkel, Huntington Woods, and Claude H. Haney, Dearborn, Mich., assignors to Advance Glove Manufacturing Company, Detroit, Mich., a corporation of Michigan
Original application Oct. 18, 1961, Ser. No. 145,907, now Patent No. 3,147,170, dated Sept. 1, 1964. Divided and this application July 29, 1964, Ser. No. 385,842
6 Claims. (Cl. 156—66)

This application is a division of our appplication Ser. No. 145,907, filed Oct. 18, 1961, now Patent No. 3,147,-170 issued Sept. 1, 1964.

This invention relates to a method and apparatus for the dielectric heat sealing of thermoplastic sheet material to cloth, and, more particularly, to a method and apparatus for tear sealing such thermoplastic sheet material to cloth.

The invention depends upon the well-known principle that heat is generated within a dielectric material when it is interposed in a radio or high frequency field. In sealing thermoplastic materials to each other by this technique, adjacent plies of such material are bonded or caused to flow together in a seal at the area subjected to such a field. The field is usually set up between two electrodes which are coupled to a source of high frequency oscillations.

More recently, this technique has been used both to seal and score the edges of thermoplastic sheet material in one operation, thus to facilitate trimming of the thermoplastic adjacent the seal. This operation is known as "tear sealing" and is described in U.S. Patent No. 2,631,-646.

In this method of tear sealing two thermoplastic sheets together, one of the electrodes in the high frequency circuit generally comprises a metal die, and a table or other similar support forms the other electrode. The die electrode includes a depending element in the form of an outer edge or wall, which element defines the embossing width and constitutes the scoring means for facilitating the ultimate trimming of the finished article. Well-known techniques and apparatus permit such tear sealing of two thermoplastic sheets together in a manner which produces a neatly trimmed, sharp clean edge.

Although tear sealing of two sheets of thermoplastic material has been possible for some time, it has not been possible heretofore to tear seal a sheet of thermoplastic material to a piece of cloth, so as to be able to trim away excess thermoplastic material adjacent the edge of the seal. Such a technique is highly desirable in the many instances where vinyl or other thermoplastic materials are used in conjunction with cloth to form any number of common articles.

Accordingly, it is an object of the present invention to provide a method and apparatus for the high frequency tear sealing of a piece of thermoplastic dielectric material to a piece of cloth. It is a further object of the instant invention to provide a method and apparatus for attaching such fabric based articles as slide fasteners (zippers) to thermoplastic material. A still further object of the invention is to provide a method and apparatus for so attaching a fabric based slide fastener to a piece of thermoplastic material as to leave a protective covering of plastic over the slide fastener, which covering can be subsequently easily detached.

These and other objects of the invention are achieved by providing an apparatus for the high frequency tear sealing of a piece of thermoplastic dielectric material to a piece of cloth comprising two relatively movable electrodes, a source of high frequency voltage, means to apply said voltage across said electrodes, one of said electrodes having a flat surface provided with a resilient cushioning pad comprised of at least two layers of polyvinyl chloride coated fabric for supporting said piece of cloth, the other of said electrodes comprising a metallic tear sealing die and including a depending scoring element, and means for moving said electrodes convergently into a position wherein said piece of thermoplastic material can be deeply impressed by said die into said piece of cloth and said scoring element can perforate said piece of thermoplastic material across the fibers of said piece of cloth. The thermoplastic material can then be easily torn where perforated, thus completing the tear seal.

In accordance with the invention, the method of tear sealing a piece of thermoplastic material to a piece of cloth comprises placing said pieces of thermoplastic material and cloth together, placing a resilient cushioning pad comprised of at least two layers of polyvinyl chloride coated fabric adjacent said piece of cloth and in contact therewith, and pressing an area of said cushioning pad and said pieces of thermoplastic material and cloth together with a metallic tear sealing die while impressing a high frequency electric field across said area, so that said thermoplastic material is deeply impressed into said piece of cloth and perforated by the fibers thereof, said thermoplastic material then being easily torn where perforated.

In the accompanying drawings forming a part of this specification,

FIG. 1 is a part diagrammatic and part elevational view of a high frequency heating and sealing device, including a press, and showing the tear sealing die in operative position on the press;

FIG. 2 is a fragmentary, enlarged view illustrating the function of the tear sealing die as it seals and scores a sheet of thermoplastic material superimposed on a piece of cloth;

FIG. 3 is a schematic view of the resilient cushioning pad used in the invention;

FIG. 4 is a perspective view of a fabric based slide fastener suitable for attaching to a piece of thermoplastic material by the method of the instant invention;

FIG. 5 is a perspective view of the tear sealing die with the major axes thereof indicated by the dot-dash lines;

FIG. 6 is a schematic view of a modification of the resilient cushioning pad suitable for use in the invention;

FIG. 7A is a schematic cross-sectional view through a piece of thermoplastic material and a piece of cloth prior to the tear sealing operation, showing the yarns in the cloth greatly enlarged;

FIG. 7B is a schematic cross-sectional view of the thermoplastic material and cloth after the tear sealing operation, showing how the thermoplastic material is deeply impressed into the piece of cloth and perforated by the yarns or fibers thereof; and FIG. 8 is a perspective view of a fabric based slide fastener attached to a piece of thermoplastic material by the method and apparatus of the instant invention, and showing the protective detachable strip of plastic covering the slide fastener.

In carrying out the invention, a high frequency dielectric heater 10 of conventional construction is employed to generate high frequency voltages and currents. The tear sealing die itself is carried by a conventional pneumatic press 11 having the usual vertically movable plunger or ram 12. This disclosure does not attempt to include a description of apparatus for moving either or both of the electrodes relative to each other, since any convenient means may be used for accomplishing this. It is preferred, however, to employ a power-operated press mechanism for this purpose, so as to provide sufficient pressure for the resilient cushioning pad to function properly, as will be hereinafter described.

Only a schematic diagram of the radio frequency oscillator has been indicated. It is to be understood that the electrodes may be coupled in any desired manner to a source of high frequency voltage, with suitable control circuits for controlling the electric field impressed between the electrodes as required or desired. Apparatus of this type is, of course, well-known to those skilled in this art.

Furthermore, the invention is described with respect to the attaching of a fabric based slide fastener or zipper to a piece of vinyl material so as to leave a protective covering of plastic over the zipper proper, which covering can be subsequently easily detached. It must be understood, however, that the method and apparatus is likewise applicable to the tear sealing of any piece of thermoplastic dielectric material to cloth.

As shown in FIG. 1, an insulating block 13 is secured to the bottom end of press ram 12 and it is to this insulating block that the metallic tear sealing die 14 is mounted by any conventional means. The apparatus further comprises a metal table or block 15 which is supported by insulating legs 16. The output of the dielectric heater 10 is applied through conductors 17 and 18 to die 14 and table 15, respectively. Thus, a high frequency circuit is adapted to be formed through the die and the table, the sheet of thermoplastic material and the piece of cloth to be tear sealed to be disposed therebetween as will hereinafter be made clear.

The tear sealing die 14 comprises a box-like device formed of brass or other suitable metal. It is fastened to a metal plate 20 and plate 20 is, in turn, fastened to insulating block 13 by screws or in any other suitable manner. Plate 20 is secured to insulating block 13 with the box-like die inverted so that its open top faces downwardly.

Die 14 is portrayed in the oval shape necessary to tear seal an object like a slide fastener, although it must be realized that many different shapes are possible. Likewise, the die 14 must be of sufficient size to contact the fabric of the slide fastener around the periphery thereof. Additionally, die 14 includes a depending scoring element 21 (see FIG. 2). Element 21 may likewise be formed of brass or the like and it serves to impress a deep score in the thermoplastic sheet material superimposed over the piece of cloth. When the die is used to tear seal a slide fastener to a piece of thermoplastic material, scoring element 21 must be disposed on the die inwardly of the periphery, as will be evident from a study of FIG. 8. Scoring element 21 is generally vertically slidably adjustable with respect to the rest of die 14, so that thermoplastic sheets of differing thicknesses may be accommodated, as will be apparent to those skilled in the art.

Table 15 is, of course, the lower electrode and on its flat surface is placed, prior to any sealing operation, a resilient cushioning pad 22, schematically illustrated in FIG. 3. Pad 22 preferably is comprised of two layers of 15–20 mil flat knit cotton jersey 23 coated with a film 24 of polyvinyl chloride. The two layers of fabric are placed with the coated surfaces facing each other, as shown in FIG. 3. The fabric layers are then placed between two layers of polyethylene terephthalate polyester film 25. Film 25 may conveniently be 2 mil thick Du Pont "Mylar" brand.

It is necessary to have the "Mylar" film 25 at the top of cushioning pad 22 to prevent the jersey 23 from being sealed to any of the thermoplastic material which might be forced through the cloth being tear sealed thereto by the action of the press. Thus, the layer of polyethylene terephthalate polyester film 25 acts as a release agent. Similarly, the bottom layer of "Mylar" film prevents any of the polyvinyl chloride coating in the pad from sticking to table 15.

When assembling cushioning pad 22 on the apparatus, the wales of the knit jersey 23 should preferably be placed perpendicularly to the longest dimension of die 14. This is illustrated schematically in FIG. 5, where axis a—a refers to the longitudinal direction of tear sealing die 14 and axis b—b indicates the direction of the wales. We have been able to tear seal comparatively short lengths, e.g., one inch, of thermoplastic material when the longitudinal axis of the die has not been at 90° to the wales of the knit cotton jersey, but we have been unable to commercially satisfactory results when tear sealing longer lengths of thermoplastic material to cloth when the directions of the wales and the longitudinal axis of die 14 have not been at right angles.

We have achieved satisfactory results with as many as four layers of polyvinyl chloride coated fabric in conjunction with six layers of "Mylar" film, with the top, bottom, and every other layer being of the "Mylar" film, as illustrated in FIG. 6. The multi-layers of the cushioning pad act as a dielectric medium. In the pad shown in FIG. 6 the modified cushioning pad 30 is comprised of four layers 31 of flat knit cotton jersey, each of which is coated on one side with a layer of polyvinyl chloride 32. In between each such coated fabric layer is placed a layer of "Mylar" brand polyethylene terephthalate polyester film 33. Additionally, a layer of "Mylar" film 34 is placed on top and, preferably, two such layers 35 and 36 are placed on the bottom.

As shown in FIG. 2, the resilient cushioning pad 22 is placed on top of table 15. A piece of cloth 40 is placed on top of the pad 22 in contact therewith. Over the piece of cloth 40 is placed the piece of thermoplastic material 41 which is to be tear sealed to the piece of cloth.

As the press ram 12 is lowered, the flat surface 42 of tear sealing die 14 presses the piece of thermoplastic material 41 deeply into the piece of cloth 40. While this is happening, scoring element 21 presses the thermoplastic material 41 into the piece of cloth 40 perforating the thermoplastic across the fibers of the piece of cloth, as will be hereinafter more fully explained.

FIG. 7A shows in schematic fashion such a piece of thermoplastic material 41, which may, for example, be a piece of vinyl. The individual yarns or fibers 43 in the piece of cloth 40 are shown greatly exaggerated. As the scoring element 21 moves downwardly, the vinyl 41 separates at the high spots over fibers 43, because of the heat and pressure, leaving a "perforated" edge, as shown in FIG. 7B. This action, it will be appreciated, is quite different from the usual vinyl to vinyl tear seal. The spacing of the perforations depends on the construction of the piece of cloth 40. Since the valleys 45 contain the vinyl that does the holding, finer weaves will have smaller valleys and so the tear seal portion can be removed more easily than with coarser cloth. Thus, upon the completion of the tear sealing operation, the piece of vinyl 41 is sealed to the piece of cloth 40 in the portions underneath the flat surface 42 of the die, but is perforated across the fibers 43 under the scoring element 21, so that the unwanted portion of the thermoplastic material can be easily removed, as by tearing. If the portion to be thus torn off is examined under a magnifying glass, it will be seen that the edges are perforated or serrated along the line of contact of scoring element 21.

We have also found that if the piece of cloth 40 is coated along the portion to be sealed with vinyl, there is improved sealing. Such an edge coating 47 is illustrated in FIG. 4 with respect to the standard fabric based slide fastener 50 which is used to illustrate this invention. The coating 47 is of a width sufficient to extend across the transverse width of die 14. With such a coating 47 on the piece of cloth 40, a cushioning pad 22 only two layers thick, as shown in FIG. 3, is all that is required.

The required pad thickness depends on the press pressure and the dielectric power output and also on the type of vinyl or other thermoplastic material to be tear sealed. For example, if a coated cloth is used, as shown in FIG. 4, a two fabric layer cushioning pad 22, as illustrated in FIG. 3, is all that is required. With this pad, to tear seal 10 mil clear vinyl a platen pressure of 120 pounds with a platen temperature of approximately 300° F. will be satisfactory. Such exceptionally high platen temperatures and pressures are unusual and contribute to the success of our method. With this pressure and temperature, the cycle on a 5 kilowatt machine would be 4 seconds under heat, pressure and high frequency voltage, with 1 second before and after, under heat and pressure, but without the high frequency voltage. Of course, platen pressures and temperatures will also depend on the size of the article, the type of press, the type of die, etc.

With colored or frosted vinyl materials, it is not necessary to use the edge coating illustrated in FIG. 4. Otherwise the resilient cushioning pad can be the same and the operating conditions can be the same as above described. In general, however, higher platen pressures, temperatures and power outputs are required for tear sealing clear vinyl than are required for frosted or colored vinyls on any particular dielectric sealing machine and with any particular area of sealing die.

Experiments with the following types of cushioning pads in different combinations were found unsatisfactory: double coated neoprene fabric, leather faced with "Mylar," cotton jersey faced with "Mylar," silicone rubber, "Teflon" polytetrafluoroethylene with polyvinyl chloride film, phenolic resin and silicon phenolic resin.

FIG. 8 illustrates a fabric based slide fastener 50 attached to a piece of vinyl 51 by the method and apparatus herein disclosed. The slide fastener 50, which had an edge coating 47 as previously described, was tear sealed to a sheet of 10 mil clear vinyl 51 under the pressure, temperature and time cycle above described. The flat surface 42 of tear sealing die 14 pressed cushioning pad 22, vinyl 51 and the zipper fabric together along spaced areas 52, as shown. The vinyl was deeply impressed into the zipper fabric under surface 42 of the die, thus to form a secure attachment at areas 52. Additionally, vinyl 51 was deeply impressed into the cloth of the slide fastener under scoring element 21, so that the vinyl was perforated by the fibers 43, as illustrated in FIG. 7B, along line 53 (see FIG. 8). After the tear sealing operation was completed, the vinyl 51 was easily torn along this line of perforations 53, thus to form a detachable strip 54, as shown. Strip 54 can, alternatively, be immediately detached, thus to expose the slide fastener 50, or it can be left on to serve as a protective covering of plastic over the slide fastener to be ultimately removed as necessary.

The advantages of so attaching a fabric based slide fastener to a piece of thermoplastic material are that two complete operations in production are eliminated, that is, there is no need to pre-cut a slot or hole for the zipper and to place the zipper in registration with the hole; and there is absolute registration at the joining seal of the fabric and the thermoplastic with relation to the hole, because by this method they are both done at the same time. Another advantage is that if strip 54 is left on, the slide fastener is protected or packaged, thus to remain clean until ultimate use.

It must be understood that the die shown and described is to illustrate only the attachment of a slide fastener to a piece of thermoplastic and that it may assume any desired shape depending upon the article being produced. Furthermore, it must be understood that other modifications may be made and that the invention is to be limited only by the scope of the following claims.

Having thus described our invention, what we claim and desire to protect by Letters Patent is:

1. A method of attaching a slide fastener to a sheet of thermoplastic material, comprising
    placing said sheet and said fastener in overlying relationship;
    pressing together selected portions of said sheet and of the slide fastener extending longitudinally of and at opposite sides of said slide fastener;
    applying heat to said selected portions while the latter are pressed together so as to fuse the material of said sheet at said portions to bond said sheet to said slide fastener at said portions; and simultaneously weakening a parallelly extending section of said sheet substantially co-extensive with the slide fastener intermediate of and in registry with said selected portions, whereby the opening formed in said sheet by removal of said weakened section will be in registry with said longitudinally extending selected portions at which said sheet and slide fastener are bonded together.

2. A method according to claim 1 wherein weakening said section comprises scoring said sheet along a pair of parallelly extending lines at opposite sides of said slide fastener but inwardly of said selected portions.

3. A method according to claim 1, wherein said selected portions of said sheet and of said slide fastener consist, respectively, of vinyl and fabric material, said method comprising placing said sheet and said fabric between a pair of relatively movable electrodes and moving said electrodes toward each other and against said selected portions.

4. A method according to claim 3, further comprising resiliently supporting said sheet on one of said electrodes, said step of applying heat comprising passing a high frequency electric field across said selected portions.

5. A method of attaching a slide fastener to a sheet of thermoplastic material, comprising
    placing said sheet and said fastener in overlying relationship;
    pressing together selected portions of said sheet and of the slide fastener extending longitudinally of and at opposite sides of said slide fastener;
    applying heat to said selected portions while the latter are pressed together so as to fuse the material of said sheet at said portions to bond said sheet to said slide fastener at said portions; and weakening a parallelly extending section of said sheet substantially co-extensive with the slide fastener intermediate of, in registry with and closely adjacent to, said selected portions, whereby the opening formed in said sheet by removal of said weakened section will be in registry with and extend closely adjacent to said longitudinally extending selected portions at which said sheet and slide fastener are bonded together.

6. A method according to claim 5, further comprising removing said parallelly extending weakened section of said sheet so as to provide in said sheet an opening substantially co-extensive with said slide fastener.

References Cited
UNITED STATES PATENTS

| | | | |
|---|---|---|---|
| 2,631,646 | 3/1953 | Gannon et al. | 156—380 |
| 2,674,559 | 4/1954 | Zobel | 156—66 |

FOREIGN PATENTS

| | | |
|---|---|---|
| 564,470 | 10/1958 | Canada. |

EARL M. BERGERT, *Primary Examiner.*

DOUGLAS J. DRUMMOND, *Examiner.*